United States Patent
Liu

(10) Patent No.: US 7,127,129 B2
(45) Date of Patent: *Oct. 24, 2006

(54) METHOD AND APPARATUS FOR PHASE SHIFTING AN OPTICAL BEAM IN AN OPTICAL DEVICE

(75) Inventor: Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/173,019

(22) Filed: Jun. 30, 2005

(65) Prior Publication Data

US 2005/0244125 A1    Nov. 3, 2005

Related U.S. Application Data

(63) Continuation of application No. 10/793,513, filed on Mar. 4, 2004, now Pat. No. 6,954,558, which is a continuation-in-part of application No. 10/603,410, filed on Jun. 24, 2003, now Pat. No. 6,801,676.

(51) Int. Cl.
  G02B 6/10   (2006.01)
  G02B 6/26   (2006.01)
  G02F 2/00   (2006.01)

(52) U.S. Cl. .............. 385/3; 385/4; 385/8; 385/14; 385/129; 385/130; 385/131; 385/132; 359/237; 359/247; 359/248; 359/279; 332/144; 332/146; 372/29.022; 372/29.023; 372/45.01; 372/46.011; 372/46.015; 372/50.123

(58) Field of Classification Search .............. 385/3, 385/4, 129, 131
See application file for complete search history.

(56) References Cited

U.S. PATENT DOCUMENTS 3,852,119 A    12/1974  Gosney et al.

(Continued)

FOREIGN PATENT DOCUMENTS

EP    1 256 825 A2    11/2002

(Continued)

OTHER PUBLICATIONS

Nowak, E.D., et al., "Speed, Power, and Yield Comparison of Thin Bonded SOI versus Bulk CMOS Technologies", Proceedings 1994 IEEE International SOI Conference, (Oct. 1994), pp. 41-42.

(Continued)

*Primary Examiner*—John R. Lee
*Assistant Examiner*—Bernard E. Souw
(74) *Attorney, Agent, or Firm*—Blakely, Sokoloff, Taylor & Zafman LLP

(57) ABSTRACT

An apparatus and method for high speed phase modulation of optical beam with reduced optical loss. In one embodiment, an apparatus includes a first region of an optical waveguide disposed in semiconductor material. The first region has a first conductivity type. The apparatus also includes a second region of the optical waveguide disposed in the semiconductor material. The second region has a second conductivity type opposite to the first conductivity type. A first contact is included in the apparatus and is coupled to the optical waveguide at a first location in the first region outside an optical path of an optical beam to be directed through the optical waveguide. The apparatus also includes a first higher doped region included in the first region and coupled to the first contact at the first location to improve an electrical coupling between the first contact and the optical waveguide. The first higher doped region has a higher doping concentration than a doping concentration within the optical path.

11 Claims, 7 Drawing Sheets

U.S. PATENT DOCUMENTS

| | | | |
|---|---|---|---|
| 4,019,197 A | 4/1977 | Lohstroh et al. | |
| 4,093,345 A | 6/1978 | Logan et al. | |
| 4,923,264 A | 5/1990 | Langer et al. | |
| 5,007,062 A | 4/1991 | Chesnoy | |
| 5,023,686 A * | 6/1991 | Helmut et al. | 257/257 |
| 5,027,253 A | 6/1991 | Lauffer et al. | |
| 5,166,946 A | 11/1992 | Caldwell | |
| 5,260,960 A * | 11/1993 | Amann et al. | 372/46.014 |
| 5,388,106 A | 2/1995 | Tabuchi | |
| 5,422,904 A * | 6/1995 | Gorfinkel et al. | 372/50.1 |
| 5,434,700 A | 7/1995 | Yoo | |
| 5,461,684 A * | 10/1995 | Vinchant et al. | 385/22 |
| 5,541,950 A * | 7/1996 | Kizuki et al. | 372/46.01 |
| 5,568,502 A * | 10/1996 | Hironaka | 372/50.1 |
| 5,610,095 A | 3/1997 | Zirngibl | |
| 5,661,825 A | 8/1997 | Van Dam et al. | |
| 5,684,819 A | 11/1997 | Zirngibl | |
| 5,726,462 A | 3/1998 | Spahn et al. | |
| 5,748,358 A * | 5/1998 | Sugamata et al. | 359/245 |
| 5,838,844 A | 11/1998 | Van Dam et al. | |
| 5,933,554 A | 8/1999 | Leuthold et al. | |
| 5,978,402 A | 11/1999 | Matsumoto et al. | |
| 5,994,729 A * | 11/1999 | Cho | 257/300 |
| 5,999,297 A | 12/1999 | Penninckx | |
| 6,008,926 A | 12/1999 | Moodie et al. | |
| 6,052,498 A | 4/2000 | Paniccia | |
| 6,122,414 A * | 9/2000 | Shimizu | 385/2 |
| 6,147,366 A | 11/2000 | Drottar et al. | |
| 6,151,347 A * | 11/2000 | Noel et al. | 372/45.01 |
| 6,198,853 B1 * | 3/2001 | Yamada | 385/2 |
| 6,222,963 B1 | 4/2001 | Grand et al. | |
| 6,298,177 B1 | 10/2001 | House | |
| 6,377,596 B1 | 4/2002 | Tanaka et al. | |
| 6,393,169 B1 | 5/2002 | Paniccia et al. | |
| 6,434,289 B1 | 8/2002 | Paniccia et al. | |
| 6,459,712 B1 | 10/2002 | Tanaka et al. | |
| 6,600,842 B1 * | 7/2003 | Yamada | 385/2 |
| 6,614,821 B1 * | 9/2003 | Jikutani et al. | 372/43.01 |
| 6,757,091 B1 | 6/2004 | Nicolaescu et al. | |
| 6,778,751 B1 | 8/2004 | Tada et al. | |
| 6,801,676 B1 * | 10/2004 | Liu | 385/3 |
| 6,845,198 B1 * | 1/2005 | Montgomery et al. | 385/50 |
| 6,870,969 B1 * | 3/2005 | Liu | 385/3 |
| 6,925,101 B1 * | 8/2005 | Matsumura | 372/46.01 |
| 6,954,558 B1 * | 10/2005 | Liu | 385/3 |
| 6,983,004 B1 * | 1/2006 | Jikutani et al. | 372/46.01 |
| 7,006,717 B1 * | 2/2006 | Liu et al. | 385/8 |
| 2001/0028755 A1 * | 10/2001 | Akiyama | 385/14 |
| 2001/0038655 A1 | 11/2001 | Tanaka et al. | |
| 2002/0051601 A1 | 5/2002 | Hung | |
| 2002/0054724 A1 | 5/2002 | Tada et al. | |
| 2002/0071621 A1 * | 6/2002 | Yamada | 385/2 |
| 2002/0089711 A1 | 7/2002 | Conzone et al. | |
| 2002/0093717 A1 | 7/2002 | Paniccia et al. | |
| 2002/0181828 A1 | 12/2002 | Irwin et al. | |
| 2002/0191886 A1 | 12/2002 | Castoldi et al. | |
| 2003/0002767 A1 | 1/2003 | Hanneman, Jr. | |
| 2003/0095736 A1 | 5/2003 | Kish, Jr. et al. | |
| 2003/0128729 A1 | 7/2003 | Matsumura | |
| 2003/0138179 A1 | 7/2003 | Akiyama et al. | |
| 2003/0198286 A1 * | 10/2003 | Belotserkovsky | 375/150 |
| 2004/0160658 A1 | 8/2004 | Liu | |
| 2004/0208454 A1 * | 10/2004 | Montgomery et al. | 385/50 |
| 2004/0213497 A1 * | 10/2004 | Liu | 385/3 |
| 2004/0228381 A1 * | 11/2004 | Jikutani et al. | 372/46 |
| 2004/0264828 A1 * | 12/2004 | Liu | 385/3 |
| 2005/0123260 A1 * | 6/2005 | Liu et al. | 385/131 |
| 2005/0175305 A1 * | 8/2005 | Liu et al. | 385/129 |
| 2005/0286851 A1 * | 12/2005 | Liu et al. | 385/129 |

FOREIGN PATENT DOCUMENTS

WO     WO 02/069004 A2     9/2002

OTHER PUBLICATIONS

Tang, C.K., et al., "Highly Efficient Optical Phase Modulator in SOI Waveguides", Electronics Letters, Mar. 16, 1995, vol. 31, No. 6, pp. 451-452.

Zhao, C.Z., et al., "Silicon-On-Insulator Optical Intensity Modulator Based on Waveguide-Vanishing Effect", Electronics Letters, Aug. 29, 1996, vol. 32, No. 18, pp. 1667-1668.

Cutolo, A., et al., "Silicon Electro-Optic Modulator Based on a Three Terminal Device Integrated in a Low-Loss Single-Mode SOI Waveguide", Journal of Lightwave Technology, Mar. 1997, vol. 15, No. 3, pp. 505-518.

Dainesi, P., et al., "CMOS Compatible Fully Integrated Mach-Zehnder Interferometer in SOI Technology", IEEE Photonics Technology Letters, Jun. 2000, vol. 12, No. 6, pp. 660-662.

* cited by examiner

METHOD AND APPARATUS FOR PHASE SHIFTING AN OPTICAL BEAM IN AN OPTICAL DEVICE

RELATED APPLICATION

This application is a continuation of and claims priority to U.S. application Ser. No. 10/793,513, filed Mar. 4, 2004, now U.S. Pat. No. 6,954,558 B2, which is a continuation-in-part application of and claims priority to U.S. application Ser. No. 10/603,410, filed Jun. 24, 2003, now U.S. Pat. No. 6,801,676 B1, entitled "Method And Apparatus For Phase Shifting An Optical Beam In An Optical Device With A Buffer Plug," and assigned to the Assignee of the present application.

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Figure 1:
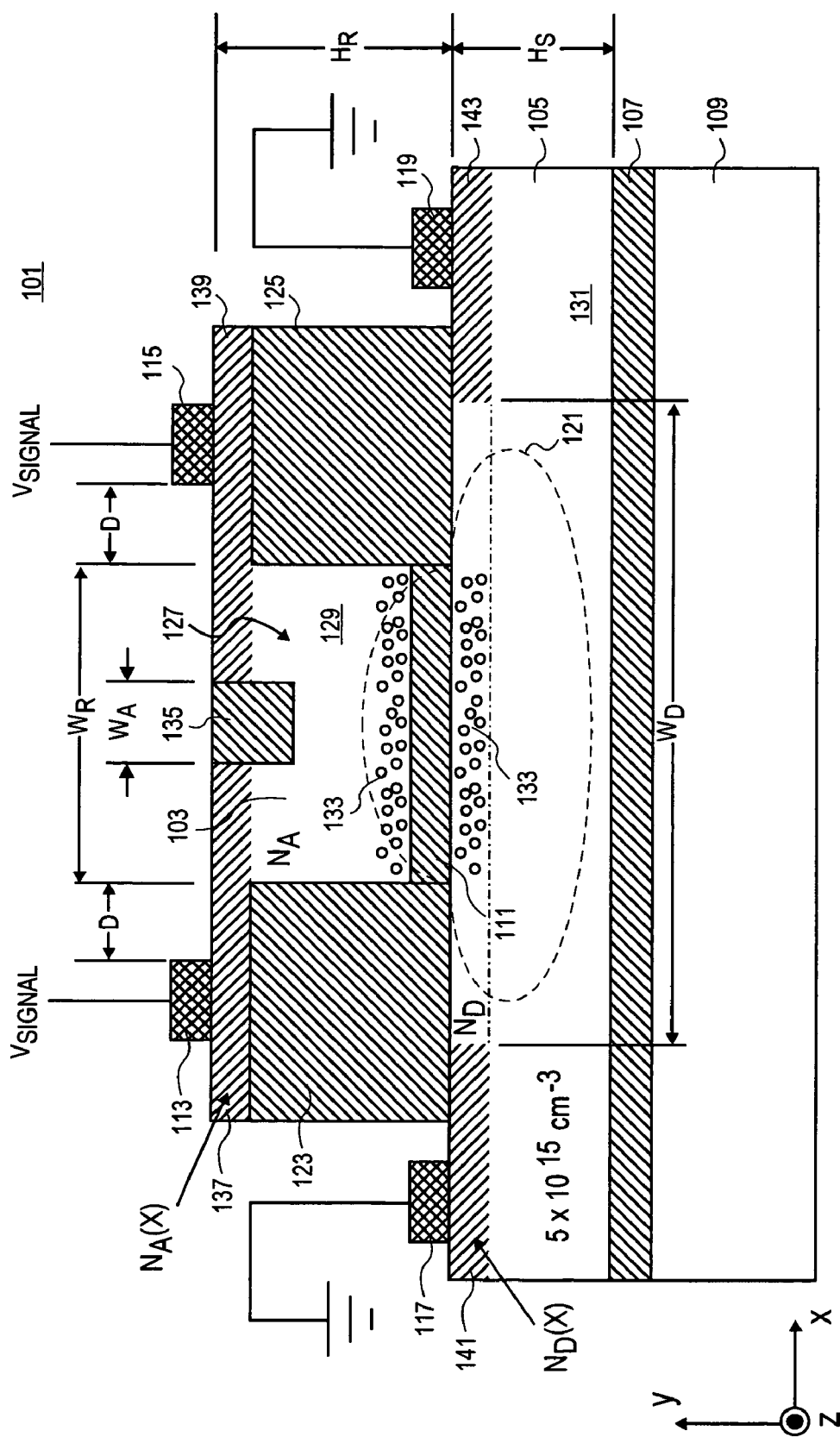
FIG. 1 is a cross-section illustration of one embodiment of an optical device having a non-uniform doping profile including a buffer of insulating material disposed between a contact and an optical path of an optical beam as well as a buffer plug to help direct a mode of the optical beam away from the contact and/or a higher doped region in accordance with the teachings of the present invention.

Methods and apparatuses for high speed phase shifting an optical beam with an optical device are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based optical device is provided in a fully integrated solution on a single integrated circuit chip. One embodiment of the presently described optical device includes a semiconductor-based waveguide having a complementary metal oxide semiconductor (CMOS) capacitor structure, a p-n junction structure or a p-i-n structure, or the like, adapted to modulate a charge concentration along an optical path to phase shift an optical beam in response to a signal. In one embodiment, the charge modulation is to occur in an optical waveguide along an optical path through the optical waveguide. An optical beam is to be directed through the waveguide and through the charge modulated region to phase shift the optical beam. In one embodiment, optical loss due to overlap between the optical mode and a metal contact or a higher doped region is reduced with a buffer of insulating material disposed between the optical path of the optical beam and the metal contact. In one embodiment, a non-uniform doping profile in the optical device enables high speed phase shifting with the higher doped region providing a lower resistor-capacitor (RC) time constant while at the same time reducing optical loss through the optical device. In one embodiment, a buffer plug is also included to help direct the mode of the optical beam away from the metal contact and/or the higher doped region to further reduce optical loss. Embodiments of the disclosed optical devices can be used in a variety of high bandwidth applications including multi-processor, telecommunications, networking as well as other high speed optical applications such as optical delay lines, switches, modulators, add/drops, or the like.

To illustrate, FIG. 1 is a cross-section illustrating generally one embodiment of an optical device having a non-uniform doping profile including a buffer of insulating material disposed between a contact and an optical path of an optical beam as well as a buffer plug to help direct a mode of the optical beam away from the contact and/or a higher doped region in accordance with the teachings of the present invention. As shown in FIG. 1, optical device 101 includes a first region of semiconductor material 103 having a first conductivity type and a second region of semiconductor material 105 having a second conductivity type. In one embodiment, semiconductor material regions include silicon, polysilicon, or other suitable types of semiconductor material. In one embodiment, semiconductor material 103 also includes p-type dopants and semiconductor material 105 includes n-type dopants. In one embodiment, the doping concentration of the p-type dopants in semiconductor material 103 is $N_A$ and the doping concentration of the n-type dopants in semiconductor material 105 is $N_D$. It is appreciated that the polarities of the dopants are provided or explanation purposes and that the polarities of the dopants and corresponding voltages may be reversed in accordance with the teachings of the present invention.

In one embodiment, an optional insulating region 111 is disposed between semiconductor material regions 103 and 105. As illustrated in FIG. 1, one embodiment of optical device 101 is fabricated on a silicon-on-insulator (SOI) wafer and therefore includes a buried insulating layer 107 and a layer of semiconductor material 109. In an embodiment including insulating region 111 disposed between semiconductor material regions 103 and 105, a complementary metal oxide semiconductor (CMOS) capacitive structure is formed. As shown in FIG. 1, charge carriers in charge regions 133 are formed proximate to insulating region 111 in semiconductor material regions 103 and 105, which form the "plates" of a capacitor while the insulating region 111 provides the insulator between the "plates."

In one embodiment, the concentration of charge carriers in charge regions 133 is modulated in response to $V_{SIGNAL}$ in accordance with the teachings of the present invention. In one embodiment, assuming $V_{SIGNAL}$ applies a positive drive voltage $V_D$, the charge density change $\Delta N_e$ (for electrons) and $\Delta N_h$ (for holes) is related to the drove voltage $V_D$ by $$\Delta N_e = \Delta N_h = \frac{\varepsilon_0 \varepsilon_r}{e t_{ox} t}[V_D - V_{FB}] \quad \text{(Equation 1)}$$

where $\epsilon_0$ and $\epsilon_r$ are the vacuum permittivity and low-frequency relative permittivity of insulating region 111; e is the electron charge, $t_{ox}$ is the thickness of insulating region 11, t is the effective charge layer thickness and $V_{FB}$ is the flat band voltage of the resulting capacitive structure.

In another embodiment, optional insulating region 111 is not included. As such, a p-n junction is formed at the interface between semiconductor material regions 103 and 105. As mentioned in one embodiment above, semiconductor material 103 includes p-type dopants and semiconductor material 105 includes n-type dopants. Depending on how the p-n junction is biased, the concentration of charge carriers in charge regions 133 are modulated in response to $V_{SIGNAL}$ in accordance with the teachings of the present invention. For instance, in one embodiment, the p-n junction may be forward biased or reverse biased as desired in response to $V_{SIGNAL}$ to modulate the concentration of charge carriers in charge regions 133 in accordance with the teachings of the present invention. In another embodiment, it is appreciated that intrinsic material may be included to provide a p-i-n structure or the like in accordance with the teachings of the present invention.

In one embodiment, an optical waveguide 127 is included in optical device 101, through which an optical beam 121 is directed along an optical path. In the embodiment illustrated in FIG. 1, waveguide 127 is a rib waveguide including a rib region 129 and a slab region 131. In one embodiment, optical beam 121 includes infrared or near infrared light. For example, in one embodiment, optical beam 121 has a wavelength near approximately 1.3 µm or 1.55 µm. In the embodiment illustrated in FIG. 1, the optical path along which optical beam 121 is directed is along an axis that parallel to the axis of the optical waveguide of optical device 101. In the example shown in FIG. 1, the optical path and therefore optical beam 121 are shown to propagate along a direction going through, or coming in and out of, the page.

As shown in the embodiment of FIG. 1, semiconductor material region 105 is grounded through contacts 117 and 119 and semiconductor material region 103 is coupled to receive $V_{SIGNAL}$ through contacts 113 and 115. In one embodiment, contacts 113, 115, 117 and 119 are metal contacts that are coupled to semiconductor material regions 103 and 105 at locations outside the optical path of optical beam 121.

In one embodiment, semiconductor material 103 includes a higher doped region 137 at the location at which metal contact 113 is coupled to semiconductor material 103. Similarly, semiconductor material 103 also includes a higher doped region 139 at the location at which metal contact 115 is coupled to semiconductor material 103. In one embodiment, the higher doped regions 137 and 139 are separated by distance $W_A$ and are substantially equally spaced from the center of optical waveguide 127, as illustrated in FIG. 1. In one embodiment, semiconductor material 105 includes a higher doped region 141 at the location at which metal contact 117 is coupled to semiconductor material 105. Similarly, semiconductor material 105 also includes a higher doped region 143 at the location at which metal contact 119 is coupled to semiconductor material 105. In one embodiment, the higher doped regions 141 and 143 are separated by distance $W_D$ and are substantially equally spaced from the center of optical waveguide 127, as illustrated in FIG. 1.

In an embodiment in which semiconductor material 103 includes p-type dopants and semiconductor material 105 includes n-type dopants, higher doped regions 137 and 139 are heavily doped with p++ type dopants and higher doped regions 141 and 143 are heavily doped with n++ type dopants. In one embodiment, the doping concentration of higher doped regions 137 and 139 is $N_A(X)$ and the doping concentration of higher doped regions 141 and 143 is $N_D(X)$. In one embodiment, the region between higher doped regions 141 and 143 has a doping concentration of $N_D$, as illustrated in FIG. 1. As also illustrated in the embodiment of FIG. 1, the region of semiconductor material 105 below higher doped regions 141 and 143 and the region between higher doped regions 141 and 143 has a different doping concentration, such as for example $5 \times 10^{15}$ cm$^{-3}$. It is appreciated of course that the $5 \times 10^{15}$ cm$^{-3}$ doping concentration is provided herewith for explanation purposes and that other doping concentrations could be utilized in accordance with the teachings of the present invention.

Thus it is appreciated that the semiconductor material of one embodiment of optical device 101 has a non-uniform doping concentration with respect to the y-axis as it may change from $5 \times 10^{15}$ cm$^{-3}$ to $N_D$ to $N_A$ along the y-axis as illustrated in one embodiment in accordance with the teachings of the present invention. In one embodiment, higher doped regions may be made of semiconductor materials such as silicon, polysilicon, silicon germanium, or any other suitable type of semiconductor material.

Similarly, it is appreciated that the inclusion of higher doped regions 137, 139, 141 and 143 in semiconductor material regions 103 and 105 define a non-uniform doping profile along the x-axis as well in an embodiment of optical device 101 in accordance with the teachings of the present invention. As mentioned above, the portions of semiconductor material 103 and 105 through which the optical path along which optical beam 121 is directed may have lower doping concentrations $N_A$, $N_D$ or $5 \times 10^{15}$ cm$^{-3}$ such that optical loss, absorption or attenuation of optical beam 121 is reduced. In addition, the portions of semiconductor material 103 and 105 outside the optical path along which optical beam 121 is directed may have higher doping concentrations, such as $N_A(X)$ and $N_D(X)$ of higher doped regions 137, 139, 141 and 143. The higher doping concentrations $N_A(X)$ and $N_D(X)$ of higher doped regions 137, 139, 141 and 143 help improve the electrical coupling of metal contacts 113, 115, 117 and 119 to semiconductor material regions 103 and 105 in accordance with the teachings of the present invention. This improved electrical coupling reduces the contact resistance between metal contacts 113, 115, 117 and 119 and semiconductor material regions 103 and 105, which reduces the RC time constant of optical device 101, which improves the electrical performance of optical device 101 in accordance with the teachings of the present invention. The reduced RC time constant of optical device 101 enables faster switching times and device speed for optical device 101 in accordance with the teachings of the present invention.

Figure 2:
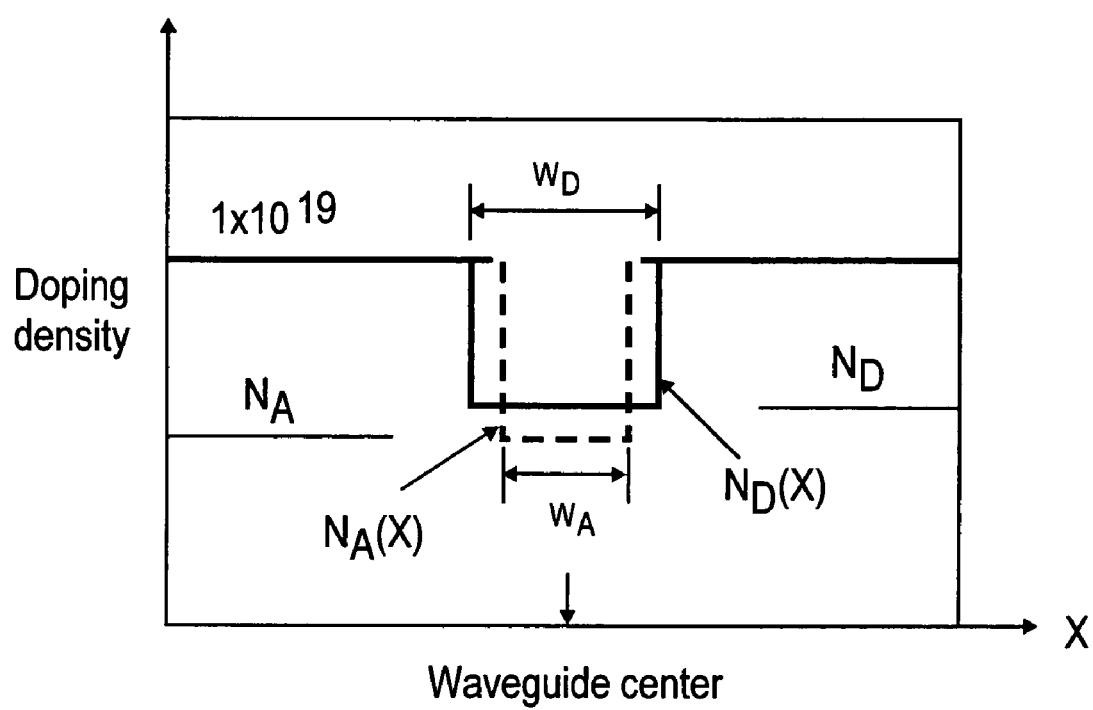
FIG. 2 is a diagram illustrating the non-uniform doping profile of semiconductor material regions in one embodiment of an optical device in accordance with the teachings of the present invention.

To illustrate the non-uniform doping profile of one embodiment optical device 101, FIG. 2 shows one embodiment of the non-uniform doping profile or doping concentrations $N_A$, $N_D$, $N_A(X)$ and $N_D(X)$ of semiconductor material regions 103 and 105 and higher doped regions 137, 139, 141 and 143 along the x-axis of optical device 101. FIG. 2 illustrates one embodiment of balancing the optical loss with the optical speed of optical device 101.

In one embodiment, the doping concentration $N_D$ of semiconductor material regions 105 between higher doped regions 141 and 143 with respect to the y-axis of FIG. 2 is a relatively low doping concentration. In one embodiment, the upper part of semiconductor region 105 with respect to the y-axis, which includes higher doped regions 141 and 143 and the region in between, has a relatively shallow doping depth having a thickness of 0.15 µm in one embodiment. As shown in FIG. 2, this upper part of semiconductor region 105 has a non-uniform doping concentration profile $N_D(X)$ along the x-axis. In one embodiment, the higher doped regions 141 and 143 have a higher doping concentration of at least approximately $1 \times 10^{19}$ cm$^{-3}$ and are spaced apart a distance $W_D$ from each other and are both substantially equally spaced from the waveguide center of optical waveguide 121, as shown in FIG. 2. It is appreciated that the $1 \times 10^{19}$ cm$^{-3}$ doping concentration value is provided for explanation purposes and that other suitable values could be utilized in accordance with the teachings of the present invention. For instance, it is appreciated that even higher doping concentration values could provide even better electrical contact resulting in further improved electrical characteristics.

In one embodiment, the doping concentration $N_A$ of semiconductor material regions 103 below higher doped regions 137 and 139 with respect to the y-axis is also relatively low doping concentration. In one embodiment, $N_A$ is approximately equal to $N_D$. In one embodiment, $N_A$ is approximately equal to and slightly less than $N_D$. In one embodiment, the wider upper part with respect to the y-axis of semiconductor region 103, which includes higher doped regions 137 and 139, has a relatively shallow doping depth having a thickness of 0.15 µm in one embodiment. As shown in FIG. 2, this upper part of semiconductor region 103 has a non-uniform doping concentration profile $N_A(X)$ along the x-axis. In one embodiment, the higher doped regions 137 and 139 also have a higher doping concentration of approximately $1 \times 10^{19}$ cm$^{-3}$ and are spaced apart a distance $W_A$ from each other and are both substantially equally spaced from the waveguide center of optical waveguide 121, as shown in FIG. 2. It is appreciated that the $1 \times 10^{19}$ cm$^{-3}$ doping concentration value is provided for explanation purposes and that other suitable values could be utilized in accordance with the teachings of the present invention. For instance, it is appreciated that even higher doping concentration values could provide even better electrical contact resulting in further improved electrical characteristics.

It is noted that embodiment shown in FIG. 2 illustrates that doping profiles $N_A(X)$ and $N_D(X)$ have both been illustrated to be step-like for explanation purposes. In another embodiment, it is appreciated that the doping profile could be smoother and not quite as sharp or step-like, as illustrated in FIG. 2, in accordance with the teachings of the present invention. In various embodiments of the present invention, the doping concentrations $N_A$, $N_D$, $N_A(X)$ and $N_D(X)$ as well as the distances $W_A$ and $W_D$ can be varied to change the optical speed and optical loss of optical device 101 in accordance with the teachings of the present invention.

Referring back to the embodiment illustrated in FIG. 1, the application of $V_{SIGNAL}$ to optical waveguide 127 results in the modulation of free charge carriers in charge regions 133, which is proximate to insulating region 111 and through which optical beam 121 is directed. As can be appreciated to a person skilled in the art having the benefit of this disclosure, modulation of free charge carriers in charge regions 133 will also occur at the p-n junction between the semiconductor material regions 103 and 105 in the embodiment that does not include optional insulating region 111. In addition, depending on how the p-n junction structure is biased, current injection techniques may also be employed to modulate the free charge carrier concentration in the p-n junction structure. Furthermore, other suitable types of structures may be employed, such as for example p-i-n structures of the like in accordance with the teachings of the present invention to modulate the concentration of free charge carriers in charge regions 133 through which optical beam 121 is directed.

In one embodiment, a buffer of insulating material 123 and a buffer of insulating material 125 are also included in an optical device 101 in accordance with the teachings of the present invention. As shown in FIG. 1, buffer 123 is disposed between contact 113 and the optical path of optical beam 121. Buffer 125 is disposed between contact 115 and the optical path of optical beam 121. In one embodiment, buffers 123 and 125 are made of materials having lower refractive indexes than the refractive index of the core of waveguide 127. As a result, buffers 123 and 125 serve as cladding so as to help confine optical beam 121 to remain within waveguide 127. In the embodiment illustrated in FIG. 1, buried insulating layer 107 also serves as cladding so as to help confine optical beam 121 to remain within waveguide 127. In one embodiment, buffers 123 and 125 also serve as electrical isolators so as to electrically isolate the contacts coupled to waveguide 127 from the optical electric field guided from optical beam 121.

In one embodiment, a buffer plug 135 of insulating material may also be disposed in optical waveguide 127. In another embodiment, buffer plug 135 of insulating material is not included in optical waveguide 127. As shown in the example embodiment of FIG. 1, buffer plug 135 is disposed in optical waveguide 127 on the "top" side with respect to the y-axis, which is the same side as the locations at which metal contacts 113 and 115 are electrically coupled to optical waveguide 127. In one embodiment, buffer plug 135 is made of a material having a lower refractive index than the refractive index of the core of waveguide 127. As a result, buffer plug 135 helps to direct the mode of optical beam 121 away from metal contacts 113 and 115 as well as higher doped regions 137 and 139 in accordance with the teachings of the present invention. In one embodiment, the width of buffer plug 135 is smaller than $W_R$. In various embodiments, the width of buffer plug 135 may be less than or equal to $W_A$ and the height of buffer plug 135 can be equal to, less, or larger than the thickness of higher doped regions 137 and 139. Both width and height of buffer plug 135 can be properly varied in accordance with the teachings of the present invention.

In operation, optical beam 121 is directed through optical waveguide 127 along an optical path through charge regions 133. $V_{SIGNAL}$ is applied to optical waveguide 127 to modulate the free charge carrier concentration in charge regions 133 in semiconductor material 103 and 105. In the embodiment including insulating layer 11, the charge regions are proximate to insulating 111. In the embodiment without insulating layer 111, the charge regions 133 may be proximate to the interface between semiconductor material regions 103 and 105 or throughout the optical waveguide, depending on how the p-n junction is biased. The applied voltage from $V_{SIGNAL}$ changes the free charge carrier density in charge regions 133, which results in a change in the refractive index of the semiconductor material in optical waveguide 127.

In one embodiment, the free charge carriers in charge regions 133 may include for example electrons, holes or a combination thereof. In one embodiment, the free charge carriers may attenuate optical beam 121 when passing through. In particular, the free charge carriers in charge regions 133 may attenuate optical beam 121 by converting some of the energy of optical beam 121 into free charge carrier energy. Accordingly, the absence or presence of free charge carriers in charge regions 133 in response to in response to $V_{SIGNAL}$ will modulate optical beam 121 in accordance with the teachings of the present invention.

In one embodiment, the phase of optical beam 121 that passes through charge regions 133 is modulated in response to $V_{SIGNAL}$. In one embodiment, the phase of optical beam 121 passing through free charge carriers in charge regions 133, or the absence of free charge carriers, in optical waveguide 127 is modulated due to the plasma optical effect. The plasma optical effect arises due to an interaction between the optical electric field vector and free charge carriers that may be present along the optical path of the optical beam 121 in optical waveguide 127. The electric field of the optical beam 121 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in optical waveguide 127 of optical device 101 is modulated in response to the modulation of free charge carriers charge regions 133. The modulated index of refraction in the waveguide of optical device 101 correspondingly modulates the phase of optical beam 121 propagating through optical waveguide 127 of optical device 101. In addition, the free charge carriers in charge regions 133 are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift φ is given by $$\phi = (2\pi/\lambda)\Delta nL \qquad \text{(Equation 2)}$$

with the optical wavelength λ, the refractive index change Δn and the interaction length L. In the case of the plasma optical effect in silicon, the refractive index change Δn due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \quad \text{(Equation 3)}$$

where $n_o$ is the refractive index of intrinsic silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters. The optical absorption coefficient change Δα due to free charge carriers in silicon are given by $$\Delta\alpha = \frac{e^3\lambda^2}{4\pi^2 c^3 \varepsilon_0 n_0}\left[\frac{\Delta N_e}{m_e^{*2}\mu_e} + \frac{\Delta N_h}{m_h^{*2}\mu_h}\right] \quad \text{(Equation 4)}$$

where λ is the wavelength of light in free space, c is the velocity of light in a vacuum, $n_o$ is the refractive index of intrinsic silicon, $m^*_e$ is the effective mass of electrons, $m^*_h$ is the effective mass of holes, $\mu_e$ is the electron mobility and $\mu_h$ is the hole mobility.

For instance, in one embodiment, the width $W_R$ of the rib region 129 of optical waveguide 127 is approximately 2.5 μm, the height $H_R$ of the rib region 129 of optical waveguide 127 is approximately 0.9 μm and the height $H_S$ of the slab region 131 of optical waveguide 127 is approximately 1.5 μm. In one embodiment, the thickness of buffer regions 123 and 125 is approximately 0.5 to 0.8 μm and the thickness of the semiconductor material region 103 between contacts 113 and 115 and buffer regions 123 and 125 is approximately 0.2 to 0.3 μm.

As illustrated in the example embodiment of FIG. 1, contacts 113 and 115 coupled to semiconductor material region 103 at locations offset a distance D from the edge of the rib region 129 of optical waveguide 127. In one embodiment, the amount of optical loss of optical beam 121 is related to the distance D between contacts 113 and 115 and the respective lateral edges of the rib region 129 of optical waveguide 127. Locating contacts 113 and 115 away from the mode optical beam 121, or outside the optical path of optical beam 121, reduces the optical loss due to metal contacts 113 and 115 in accordance with the teachings of the present invention.

In one embodiment, it is noted that by reducing the distance D between contacts 113 and 115 and charge regions 133, the speed of optical device 101 may be further increased due to the reduced RC time constant of the device. Furthermore, as stated previously, with the inclusion of higher doped regions 137 and 139, the electrical coupling between contacts 113 and 115 and optical waveguide 127 is further improved, which further reduces RC time constant of the optical device 101 in accordance with the teachings of the present invention.

Therefore, in one embodiment, metal contacts 113 and 115 may be located very close to the center of optical waveguide 127 in accordance with the teachings of the present invention with substantially little or no optical loss due to contacts 113 and 115 while the operating speed is still high. Indeed, it is appreciated that without buffers 123 and 125, a relatively high amount of optical loss may result due to an overlap between the optical mode of optical beam 121 and contacts 113 and/or 115.

Figure 3:
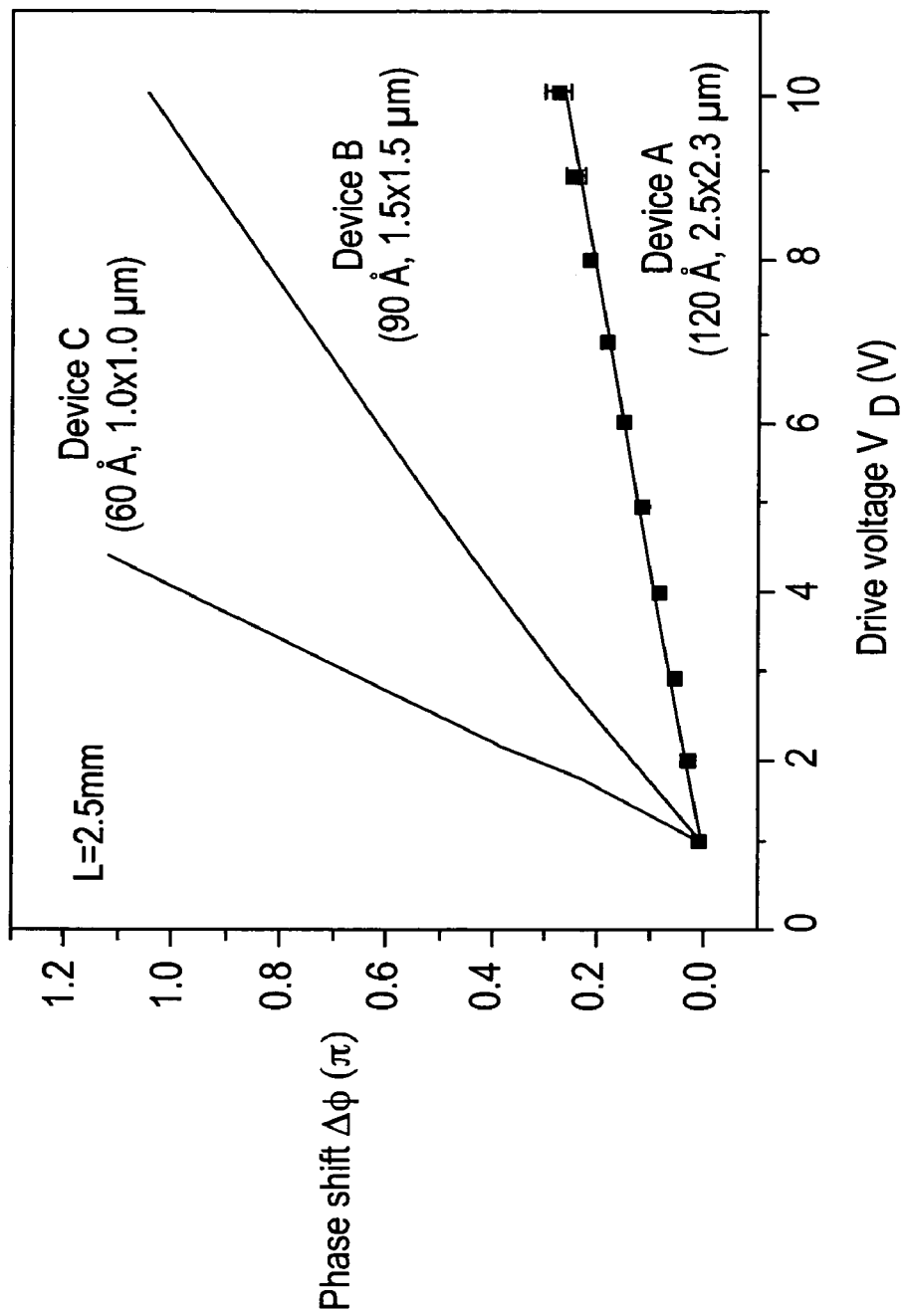
FIG. 3 is a diagram illustrating the phase shift with respect to drive voltage of various embodiments of optical devices in accordance with the teachings of the present invention.

To illustrate a relationship between phase modulation efficiency of various embodiments of optical device 101 with different dimensions, FIG. 3 illustrates phase shift of various embodiments of optical device 101. The embodiments of the optical devices illustrated in FIG. 3 are referred to as Device A, Device B and Device C. In the illustrated embodiments, the dimensions of optical waveguide 127 are designed to accommodate a single mode optical beam 121. In the illustrated embodiments, the Device A embodiment includes an insulating region 111 having a thickness of approximately 120 Angstroms. The Device A embodiment has approximate waveguide dimensions of $W_R$=2.5 μm, $H_R$=0.9 μm and $H_S$=1.4 μm, such that the total height of the optical waveguide is 2.3 μm. The Device B embodiment includes an insulating region 111 having a thickness of approximately 90 Angstroms and approximate waveguide dimensions of $W_R$=1.5 μm, $H_R$=0.6 μm and $H_S$=0.9 μm, such that the total height of the optical waveguide is 1.5 μm. The Device C embodiment includes an insulating region 111 having a thickness of approximately 60 Angstroms and approximate waveguide dimensions of $W_R$=1.0 μm, $H_R$=0.5 μm and $H_S$=0.5 μm, such that the total height of the optical waveguide is 1.0 μm. In the embodiments illustrated in FIG. 3, insulating region 111 includes an oxide material and the device length is approximately 2.5 mm. It is appreciated that these dimensions are provided for explanation purposes and that other dimensions may be utilized in accordance with the teachings of the present invention.

As can be appreciated from FIG. 3, the Device A, B and C embodiments illustrate that reductions in the waveguide dimensions and the thickness of the insulating region 111 increases the phase shift for a given device length L and drive voltage $V_D$ in accordance with the teachings of the present invention. Such device scaling introduces design flexibilities enabling one to select convenient drive voltages $V_D$ and/or devices lengths L to be compatible with a chosen application in accordance with the teachings of the present invention. As can be appreciated in FIG. 3, the Device C embodiment exhibits better phase modulation efficiency compared to the Device A or B embodiments.

Figure 4:
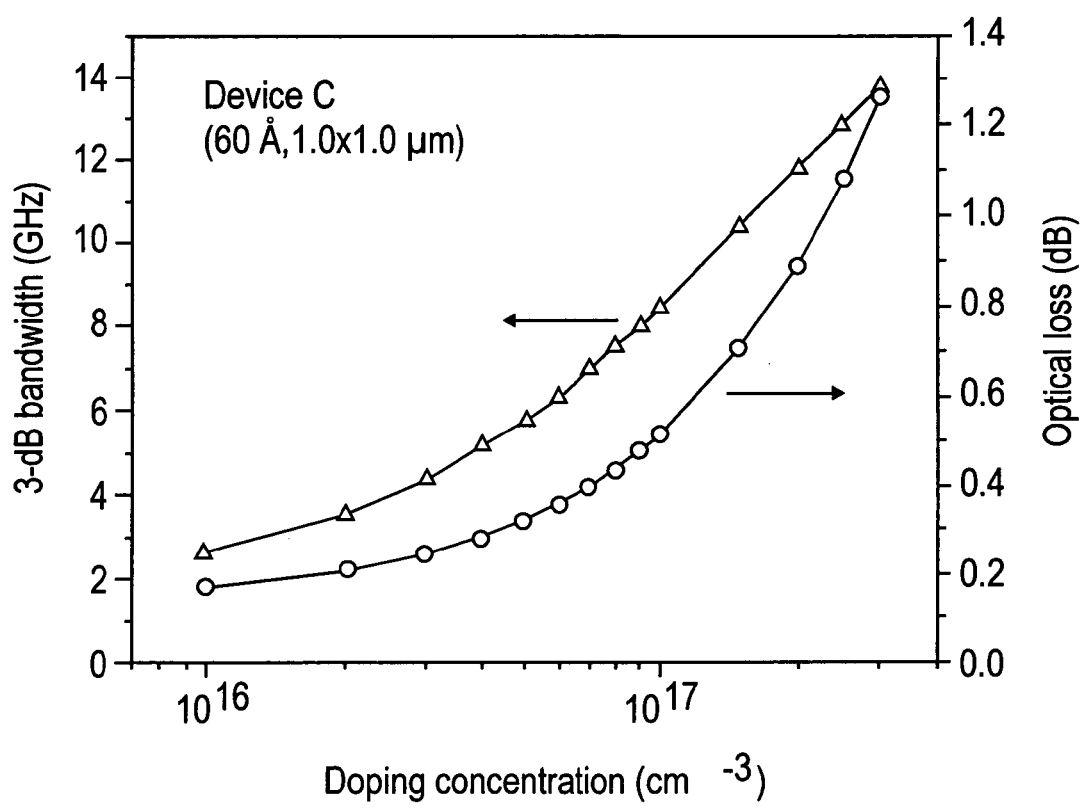
FIG. 4 is a diagram illustrating the relationships of speed and optical loss with respect to doping concentration of one embodiment of an optical device in accordance with the teachings of the present invention.

FIG. 4 is a diagram illustrating the relationships of device speed (in GHz) and optical loss (in dB) with respect to doping concentration (in $cm^{-3}$) for the Device C embodiment. In the illustrated example, the Device C embodiment has approximate doping concentrations of $N_A$=$N_D$ and doping widths of approximately $W_A$=1.0 μm and $W_D$=2.0 μm. As can be appreciated from FIG. 4, the 3-dB modulation bandwidth increases with an increase in the doping concentration $N_A$ and $N_D$. When the doping level reaches approximately $1.5\times10^{17}$ $cm^{-3}$, a 10 GHz bandwidth is obtained in the illustrated embodiment. The embodiment illustrated in FIG. 4 also shows that the modulation bandwidth can be scaled to even higher values with higher doping concentrations. In various embodiments, it is appreciated that the device operation speed depends on not only the intrinsic bandwidth of the phase shifter but also the drive circuitry. Therefore, it is appreciated that the $1.5\times10^{17}$ $cm^{-3}$ doping concentration value is provided for explanation purposes and that other suitable values could be utilized in accordance with the teachings of the present invention. As mentioned, it is appreciated that the modulation bandwidth can be scaled to even higher values with higher doping concentrations providing an even higher speed device. In addition, it is appreciated that the doping widths of approximately $W_A$=1.0

μm and $W_D$=2.0 μm could also be scaled smaller to further improve the RC time constant to provide an even higher speed device. Furthermore, it is appreciated that the approximate waveguide dimensions of $W_R$=1.0 μm, $H_R$=0.5 μm and $H_S$=0.5 μm can also be scaled down to improve device speed.

FIG. 4 also shows that in the illustrated embodiment, increasing the doping concentrations also increases the optical loss due to free carrier absorption, as is evident from Equation 4 above. For a doping concentration of approximately $1.5 \times 10^{17}$ cm$^{-3}$, which leads to an approximately 10 GHz modulation bandwidth in the illustrated example, the phase shifter loss is approximately 0.7 dB. It is appreciated that the approximately 0.7 dB optical loss is the passive phase shifter loss without applied voltage. In one embodiment, an additional loss of for example approximately 1 dB results when there is a π/2 phase shift due to voltage induced free carrier absorption in the optical device.

It is appreciated of course that the precise device speeds, modulation bandwidths, optical losses, doping concentrations, materials etc. have been provided herewith for explanation purposes and that other suitable values or materials may be chosen in other embodiments or applications in accordance with the teachings of the present invention. As mentioned, it is appreciated that by scaling down dimensions such as $W_A$, $W_D$, $W_R$, $H_R$, $H_S$ and the thickness of insulating region 111 as well as adjusting the doping concentrations up or down of $N_A$, $N_D$, $N_A(X)$ and $N_D(X)$ is discussed herein for suitable applications, very high speed bandwidth operation with acceptable electrical characteristics and reduced optical loss are now possible with an optical device 101 in accordance with the teachings of the present invention.

Referring now back to the embodiment of FIG. 1, buffer plug 135 may be included in optical device 101 to further reduce optical loss by helping direct the mode of optical beam 121 downward in FIG. 1 away from metal contacts 113 and 115 and/or higher doped regions 137 and 139, which helps to reduce, or even prevent, the guided optical field penetration of optical beam 121 in higher doped regions 137 and 139. Indeed, by directing the mode of optical beam 121 away from higher doped regions 137 and 139 as well as metal contacts 113 and 115, the significant optical absorption of optical beam 121 by the higher doped polysilicon of higher doped regions 137 and 139 is further reduced, or even prevented, in accordance with the teachings of the present invention.

Figure 5:
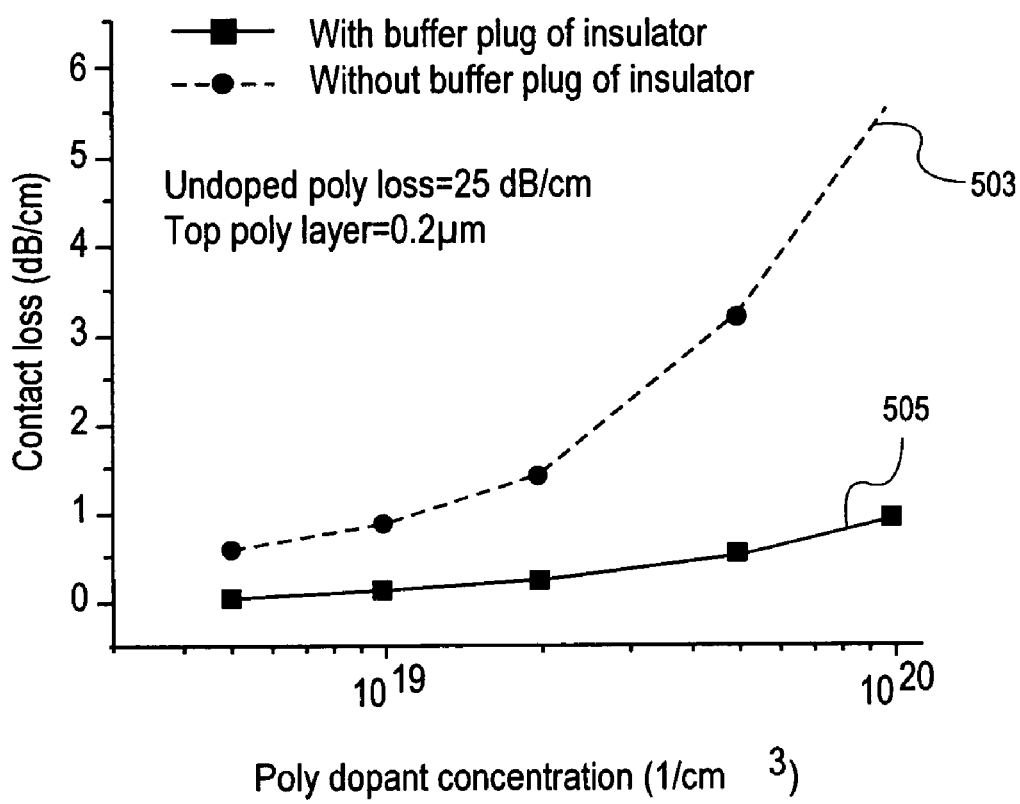
FIG. 5 is a plot illustrating a relationship between contact loss and dopant concentration of the higher doped regions according to one embodiment of an optical device in accordance with the teachings of the present invention.

To illustrate, FIG. 5 shows a diagram 501 illustrating the loss in according to one embodiment of an optical device in accordance with the teachings of the present invention. In the depicted embodiment, the higher doped regions 137 and 139 include polysilicon and have a thickness of 0.2 μm. In the illustrated embodiment, undoped polysilicon has a loss of 25 dB/cm. As shown in FIG. 5, plot 503 shows the relationship between contact loss and polysilicon dopant concentration for an embodiment of an optical device 101 without a buffer plug 135 of insulation. As mentioned above, as polysilicon dopant concentration increases, the RC time constant is reduced, which improves the performance of optical device 101. However, as shown with plot 503, contact loss increases significantly as the polysilicon dopant concentration increases. In contrast, plot 505 shows the relationship between contact loss and polysilicon dopant concentration for an embodiment of an optical device 101 that includes buffer plug 135 of insulation. As shown with plot 503, contact loss is reduced with buffer plug 135. Furthermore, contact loss does not increase nearly as significantly for increases in polysilicon dopant concentration when compared with plot 503.

Figure 6:
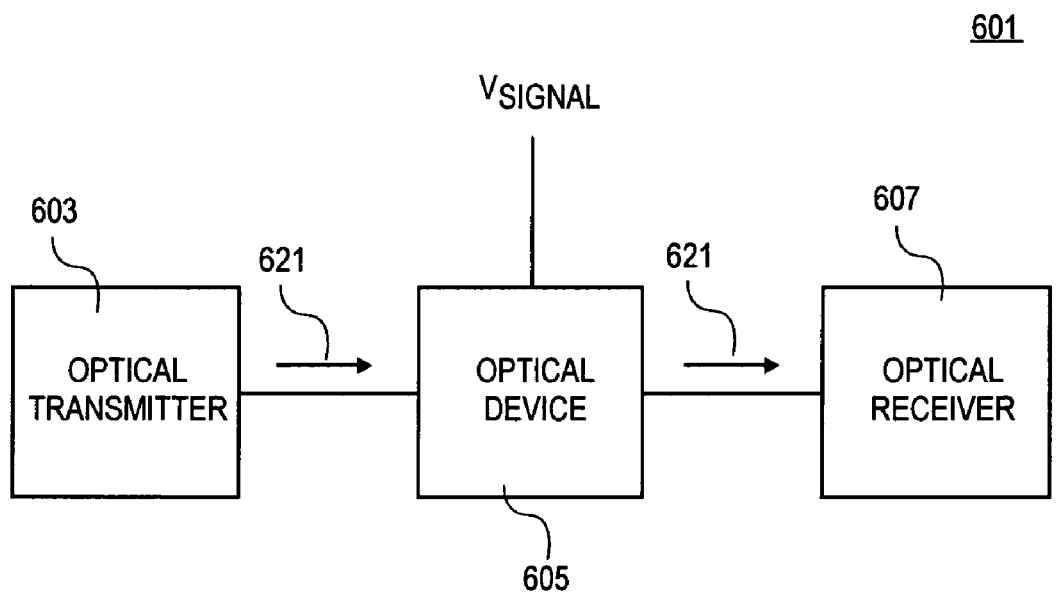
FIG. 6 is a block diagram illustration of one embodiment of a system including an optical transmitter and an optical receiver with an optical device including a one embodiment of an optical phase shifter according to embodiments of the present invention.

FIG. 6 illustrates generally a block diagram of one embodiment of a system including an optical transmitter and an optical receiver with an optical device including an optical phase shifter according to embodiments of the present invention. In particular, FIG. 6 shows optical system 601 including an optical transmitter 603 and an optical receiver 607. In one embodiment, optical system 601 also includes an optical device 605 optically coupled between optical transmitter 603 and optical receiver 607. As shown in FIG. 6, optical transmitter 603 transmits an optical beam 621 that is received by optical device 605. In one embodiment, optical device 605 may include for example a device such as optical device 101 described above in connection with FIGS. 1–5 to phase shift optical beam 621 in response to signal $V_{SIGNAL}$. In such an embodiment, optical device 605 may serve as an optical delay. In another embodiment, optical device 605 may be employed in an optical amplitude modulator or the like. In various embodiments according to the teachings of the present invention, it is appreciated that optical device 605 can be designed with scaled down waveguide dimensions and non-uniform doping profiles along the x-axis and/or y-axis as discussed above to operate at high speeds such as for example 10 GHz and beyond without excessive optical loss as discussed above. As a result, an embodiment of optical device 605 in may be fabricated in for example a high-speed silicon modulator for data communication and chip-to-chip interconnect applications in accordance with the teachings of the present invention.

Figure 7:
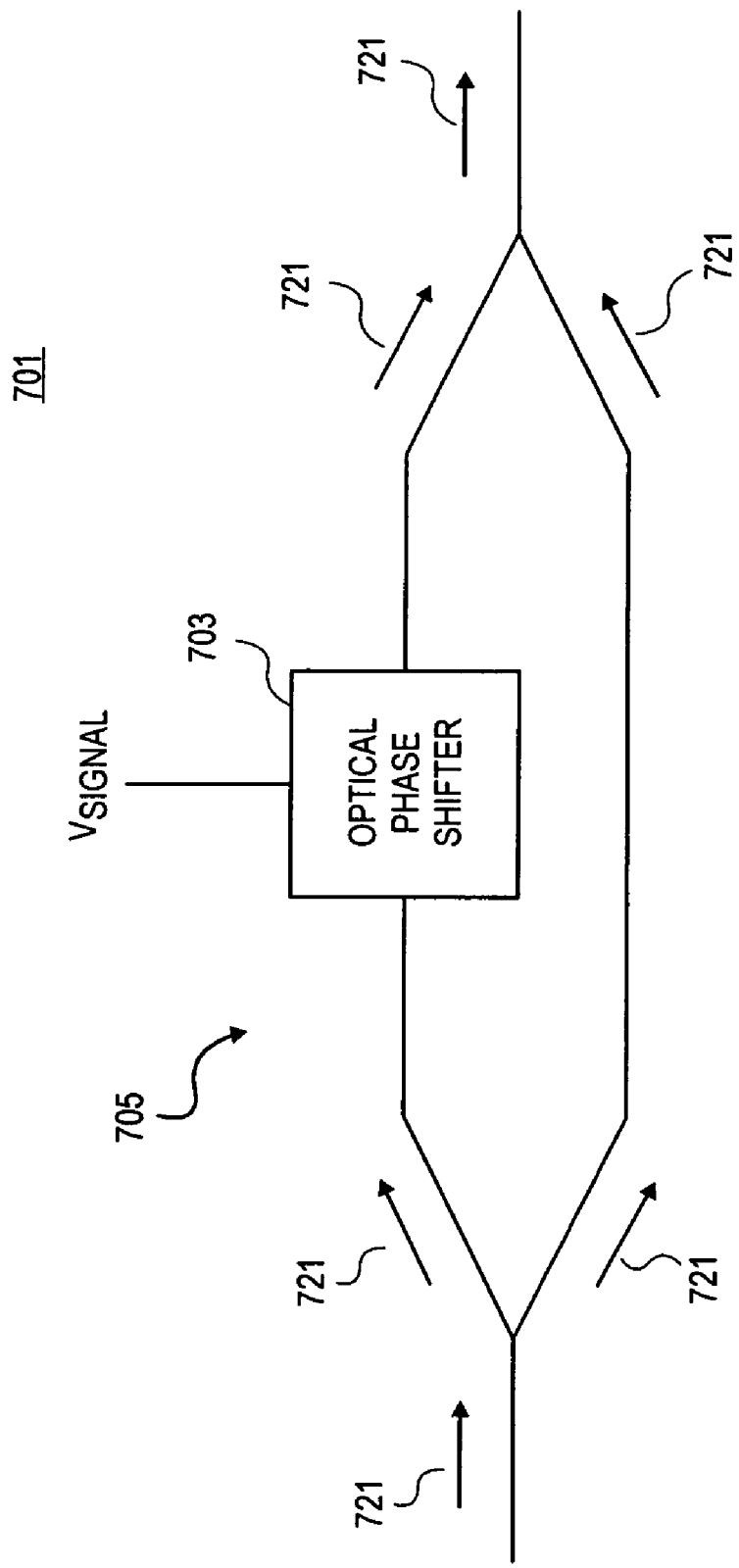
FIG. 7 is a block diagram illustration of one embodiment of an optical modulator including a Mach Zehnder Interferometer (MZI) configuration having one embodiment of an optical phase shifter according to embodiments of the present invention.

For instance, in one embodiment of the present invention, a semiconductor-based optical amplitude modulator is provided in a fully integrated solution on a single integrated circuit chip. In particular, FIG. 7 illustrates generally one embodiment of an optical modulator 701 that can be employed in place optical device 605 of FIG. 6. As shown in the depicted embodiment, optical modulator 701 includes an optical phase shifter 703 in at least one of the two arms optically coupled between cascaded Y-branch couplers of a Mach-Zehnder Interferometer (MZI) configuration 705 disposed in semiconductor material. In one embodiment, optical phase shifter 703 is similar to an embodiment of optical device 101 described above in connection with FIGS. 1–5.

In operation, an optical beam 721 is directed into an input of MZI configuration 705. Optical beam 721 is split such that a first portion of the optical beam 721 is directed through one of the arms of the MZI configuration 705 and a second portion of optical beam 721 is directed through the other one of the arms of the MZI configuration 705. As shown in the depicted embodiment, one of the arms of the MZI configuration 705 includes optical phase shifter 703, which adjusts a relative phase difference between the first and second portions of optical beam 721 in response to signal $V_{SIGNAL}$. In one embodiment, the first and second portions of optical beam 721 are then merged in the semiconductor substrate such that optical beam 721 is modulated at the output of MZI configuration 705 as a result of constructive or destructive interference. In one embodiment, as shown, one of the arms of the MZI configuration 705 includes an optical phase shifter 703. In another embodiment, both of the arms of the MZI configuration 705 may include an optical phase shifter 703 in accordance with the teachings of the present invention. In various embodiments according to the teachings of the present invention, it is appreciated that optical phase shifter 703 can be designed with scaled down waveguide dimensions and non-uniform doping concentrations and profiles operate at high speeds such as for example 10 GHz and beyond without excessive optical loss is discussed above.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claim is:

1. An apparatus, comprising:
   a first region of semiconductor material having a first conductivity type;
   a second region of semiconductor material disposed proximate to the first region of semiconductor material, the second region having a second conductivity type, the first conductivity type opposite to the first conductivity type;
   an optical waveguide defined in the semiconductor material, the optical waveguide having an optical path defined along an interface between the first region of semiconductor material and the second region of semiconductor material;
   a first higher doped region included in the first region of semiconductor material outside the optical path of the optical waveguide, the first higher doped region having a higher doping concentration than a doping concentration than the first region; and
   a first contact coupled to the first higher doped region of the first region outside the optical path of the optical waveguide.

2. The apparatus of claim 1 further comprising a first buffer of insulating material disposed between the optical path of the optical waveguide and the first higher doped region.

3. The apparatus of claim 1 further comprising a buffer plug of insulating material disposed in the optical waveguide next to the first higher doped region to help direct a mode of an optical beam to be directed along the optical path through optical waveguide away from the first higher doped region and away from the first contact.

4. The apparatus of claim 1 further comprising:
   a second higher doped region included in the first region of semiconductor material outside the optical path of the optical waveguide, the second higher doped region having a higher doping concentration than the doping concentration than the first region; and
   a second contact coupled to the second higher doped region of the first region outside the optical path of the optical waveguide.

5. The apparatus of claim 4 further comprising a second buffer of insulating material disposed between the optical path of the optical waveguide and the second higher doped region.

6. The apparatus of claim 1 further comprising:
   a third higher doped region included in the second region of semiconductor material outside the optical path of the optical waveguide, the third higher doped region having a higher doping concentration than the doping concentration than the second region; and
   a third contact coupled to the third higher doped region of the second region outside the optical path of the optical waveguide.

7. The apparatus of claim 6 further comprising:
   a fourth higher doped region included in the second region of semiconductor material outside the optical path of the optical waveguide, the fourth higher doped region having a higher doping concentration than the doping concentration than the second region; and
   a fourth contact coupled to the fourth higher doped region of the second region outside the optical path of the optical waveguide.

8. The apparatus of claim 1 further comprising a charge modulated region to be modulated along the interface between the first region of semiconductor material and the second region of semiconductor material in response to a signal to be applied to the first contact, the charge modulated region to modulate a phase of an optical beam to be directed along the optical path through the optical waveguide.

9. The apparatus of claim 1 wherein the semiconductor material comprises silicon.

10. The apparatus of claim 1 wherein one of the first and second regions of semiconductor material comprises P type dopants and the other of the first and second regions of semiconductor material comprises N type dopants.

11. The apparatus of claim 1 wherein the optical waveguide comprises a single mode rib waveguide.

* * * * *